US012636896B2

(12) United States Patent
Shiraishi

(10) Patent No.: US 12,636,896 B2
(45) Date of Patent: May 26, 2026

(54) TEXTILE-PRINTED IMAGE FORMED PRODUCT, INKJET INK, OVERCOAT LAYER FORMING LIQUID, PRETREATMENT LIQUID, AND IMAGE FORMING APPARATUS

(71) Applicant: Konica Minolta, Inc., Tokyo (JP)

(72) Inventor: Masaharu Shiraishi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 129 days.

(21) Appl. No.: 18/604,468

(22) Filed: Mar. 13, 2024

(65) Prior Publication Data

US 2024/0316952 A1 Sep. 26, 2024

(30) Foreign Application Priority Data

Mar. 24, 2023 (JP) ................................ 2023-048034

(51) Int. Cl.

| | |
|---|---|
| ***B41J 3/407*** | (2006.01) |
| ***B41J 2/21*** | (2006.01) |
| ***B41M 5/00*** | (2006.01) |
| ***B41M 7/00*** | (2006.01) |
| *D06P 5/30* | (2006.01) |

(52) U.S. Cl.

CPC ........... *B41J 3/4078* (2013.01); *B41J 2/2114* (2013.01); *B41M 5/0017* (2013.01); *B41M 5/0047* (2013.01); *B41M 7/0018* (2013.01); *D06P 5/30* (2013.01)

(58) Field of Classification Search

CPC .......... B41J 3/4078; B41J 2/2114; D06P 5/30; D06P 5/00; D06P 5/02; B41M 5/00; B41M 5/0011; B41M 5/0017; B41M 5/0023; B41M 5/0041; B41M 5/0047; B41M 7/00; B41M 7/0018

See application file for complete search history.

(56) References Cited

U.S. PATENT DOCUMENTS

2013/0137805 A1* 5/2013 Salomons ............ G03G 7/0006 524/290

2018/0094380 A1* 4/2018 Yagi ...................... D06P 1/6493

FOREIGN PATENT DOCUMENTS

JP 2020105304 A * 7/2020

JP 2023-031506 A 3/2023

WO WO-2020242473 A1 * 12/2020 ................ D06P 5/30

OTHER PUBLICATIONS

Mizui, Machine TranslationofJP-2020105304-A, 2020 (Year: 2020).*

* cited by examiner

*Primary Examiner* — Scott A Richmond

(74) *Attorney, Agent, or Firm* — LUCAS & MERCANTI, LLP

(57) ABSTRACT

A textile-printed image formed product including: a fabric and a textile-printed image formed on the fabric, the textile-printed image including a pretreatment layer, a fixing layer, and an overcoat layer. In the textile-printed image formed product, an adhesion amount of the textile-printed image is 1 g/m$^2$ to 10 g/m$^2$, when the textile-printed image formed product and a fabric on which the textile-printed image is not formed are measured with a friction tester KES-SE, a difference in average friction coefficient MIU is 0.42 or less; and when the textile-printed image formed product and the fabric on which the textile-printed image is not formed are measured with a bending tester KES-FB2-A, a difference in bending torque is 0.006 gf·cm or less.

6 Claims, 2 Drawing Sheets

TEXTILE-PRINTED IMAGE FORMED PRODUCT, INKJET INK, OVERCOAT LAYER FORMING LIQUID, PRETREATMENT LIQUID, AND IMAGE FORMING APPARATUS

CROSS REFERENCE TO RELATED APPLICATIONS

The entire disclosure of Japanese Patent Application No. 2023-48034 filed on Mar. 24, 2023, is incorporated herein by reference in its entirety.

BACKGROUND

Technological Field

The present invention relates to a textile-printed image formed product, an inkjet ink, an overcoat layer forming liquid, a pretreatment liquid, and an image forming apparatus.

Description of Related Art

As a textile printing method, exhaust textile printing in which textile printing is performed by immersing a fabric in a bath filled with a dye has been conventionally known, but since it takes a long time to dye, production efficiency has been low. In recent years, so-called ink jet textile printing, in which an image is formed on a fabric by an ink jet method, has been widely used because dyeing can be performed in a short time and production efficiency is high.

In ink jet textile printing, fine droplets of ink are discharged from an ink jet recording head and landed on a fabric to form an image. For example, Japanese Unexamined Patent Publication No. 2023-31506 discloses a method for producing a printed product by such inkjet.

SUMMARY

In ink jet textile printing, a textile-printed image formed on a fabric may be sticky, and the texture of the fabric on which the textile-printed image is formed may be deteriorated.

An object of the present invention is to provide a textile-printed image formed product capable of suppressing stickiness of a textile-printed image formed on a fabric and deterioration of texture of the fabric on which the textile-printed image is formed, and an image forming apparatus for producing the textile-printed image. It is also an object of the present invention to provide an inkjet ink, an overcoat layer forming liquid, and a pretreatment liquid for forming the textile-printed image product.

The present invention relates to the following textile-printed image, inkjet ink, overcoat layer forming liquid, pretreatment liquid, and image forming apparatus.

In order to achieve at least one of the abovementioned objects, a textile-printed image formed product reflecting one aspect of the present invention includes a fabric and a textile-printed image formed on the fabric, the textile-printed image including a pretreatment layer, a fixing layer, and an overcoat layer. In the textile-printed image formed product, an adhesion amount of the textile-printed image is 1 $g/m^2$ to 10 $g/m^2$, and when the textile-printed image formed product and a fabric on which the textile-printed image is not formed are measured with a friction tester KES-SE, a difference in average friction coefficient MIU is 0.42 or less; and when the textile-printed image formed product and the fabric on which the textile-printed image is not formed are measured with a bending tester KES-FB2-A, a difference in bending torque is 0.006 gf·cm or less.

An inkjet ink reflecting one aspect of the present invention is an inkjet ink used to form the fixing layer of the above-described textile-printed image formed product, in which the inkjet ink comprises a fixing resin having a glass transition temperature Tg of −35° C. or lower.

An overcoat layer forming liquid reflecting one aspect of the present invention is an overcoat layer forming liquid used for forming the overcoat layer of the textile-printed image formed product described above, and contains anionic resin fine particles having a glass transition temperature Tg of 50° C. or higher.

A pretreatment liquid reflecting one aspect of the present invention is a pretreatment liquid used for forming the pretreatment layer of the textile-printed image formed product, and contains a cationic resin having a weight average molecular weight Mw of 1,000 to 10,000.

An image forming apparatus reflecting one aspect of the present invention produces the above-described textile-printed image formed product.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
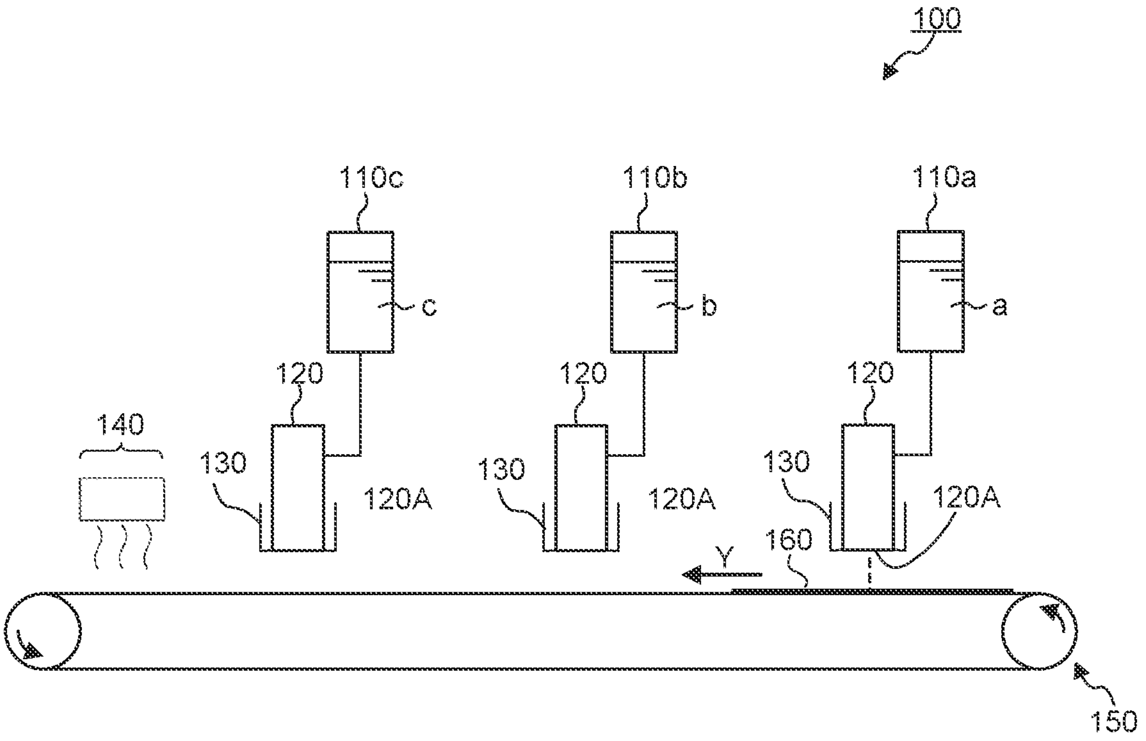
FIG. 1 is a schematic diagram illustrating an image forming apparatus according to the present embodiment.

Hereinafter, one or more embodiments of the present invention will be described with reference to the drawing. However, the scope of the invention is not limited to the disclosed embodiments.

In order to suppress the stickiness of the textile-printed image having the pretreatment layer, the fixing layer, and the overcoat layer, for example, it is conceivable to harden the resin contained in the fixing layer formed on the pretreatment layer. However, when the resin contained in the fixing layer is hardened, the texture of the fabric on which the textile-printed image is formed is deteriorated. As described above, in the textile-printed image, the suppression of stickiness of the textile-printed image and the texture of the fabric are in a trade-off relationship, and it is difficult to achieve both of them.

However, according to the textile-printed image according to the embodiment of the present invention, both suppression of stickiness and texture can be achieved.

It is considered that the suppression of stickiness can be evaluated by the friction coefficient of the textile-printed image being small. It is considered that the texture can be evaluated by the bending torque of the fabric, on which the textile-printed image is formed (textile-printed image formed product), being small.

To be specific, in the textile-printed image formed product according to the present embodiment, the fabric on which the textile-printed image is formed (textile-printed image formed product) and the fabric on which the textile-printed image is not formed are respectively measured by the friction tester KES-SE. In the textile-printed image formed product, the adhesion amount of the textile-printed image (total adhesion amount of the pretreatment layer, the fixing layer, and the overcoat layer) is set to 1 $g/m^2$ to 10 $g/m^2$. At this time, the difference in average friction coefficient MIU may be 0.42 or less. Further, the difference in the average deviation MMD of the average friction coefficient is preferably 0.24 or less.

In addition, a fabric on which the textile-printed image is formed (textile-printed image formed product) and a fabric on which the textile-printed image is not formed are respectively measured by a bending tester KES-FB2-A. In the textile-printed image formed product, the adhesion amount of the textile-printed image (total adhesion amount of the pretreatment layer, the fixing layer, and the overcoat layer) is set to 1 $g/m^2$ to 10 $g/m^2$. At this time, a difference in bending torque is equal to or less than 0.006 gf·cm.

The adhesion amount of the textile-printed image may be 1 $g/m^2$ to 10 $g/m^2$, more preferably 3 $g/m^2$ to 10 $g/m^2$ and still more preferably 3 $g/m^2$ to 8 $g/m^2$.

The fabric on which a textile-printed image is formed is not particularly limited as long as the textile-printed image can be formed. Examples of the type of fiber material forming the fabric include natural fibers such as cotton (cellulose fiber), hemp, wool, and silk; and chemical fibers such as rayon, vinylon, nylon, acrylic, polyurethane, polyester, and acetate. The fabric may be any form of these fibers, such as a woven fabric, a nonwoven fabric, and a knitted fabric. In addition, the fabric may be a blended woven fabric or a blended nonwoven fabric of two or more types of fibers. The fabric is preferably, for example, cotton satin.

As described above, the textile-printed image of the textile-printed image formed product according to the present embodiment includes a pretreatment layer, a fixing layer, and an overcoat layer, which are formed from a pretreatment liquid, an inkjet ink, and an overcoat layer forming liquid, respectively. Hereinafter, each of them will be described.

1-1. Pretreatment Liquid

The pretreatment liquid is first applied to the fabric. The pretreatment liquid is applied onto the fabric to form a pretreatment layer. The pretreatment liquid contains a cationic resin, and the cationic resin promotes aggregation of the fixing resin and the pigment in the inkjet ink to promote fixing of the fixing layer.

The weight average molecular weight (Mw) of the cationic resin is preferably 1,000 or more, from the viewpoint of suppressing stickiness of a textile-printed image. On the other hand, the upper limit of the weight average molecular weight of the cationic resin is preferably 10,000 or less from the viewpoint of dispersibility in the pretreatment liquid. That is, the weight average molecular weight of the cationic resin is preferably 1,000 to 10,000. The weight average molecular weight (Mw) of the cationic resin can be measured by gel permeation chromatography in terms of polystyrene.

Examples of the cationic resin include polyamine, diallylamine hydrochloride polymer, diallylamine polymer, methyldiallylamine hydrochloride polymer, methyldiallylamine amide sulfate polymer, methyldiallylamine acetate polymer, diallyldimethylammonium chloride polymer, diallylmethylethylammonium ethylsulfate polymer, amine-epichlorohydrin condensation type polymer, poly-2-hydroxypropyldimethylammonium chloride, dimethylamine-ethylenediamine-epichlorohydrin condensate, dimethylamine-ammonia-epichlorohydrin condensate, and the like.

Examples of commercially available products of the cationic resin include PAS-H-L manufactured by Nittobo Medical Co., Ltd., Catiomaster (Registered Trademark) PD-7, PD-30, and PE-30 manufactured by Shikoku Chemicals Corporation, and Unisence KHE manufactured by Senka Co., Ltd.

The content of the cationic resin is preferably 0.1% by mass to 10% by mass relative to the pretreatment liquid.

The method of applying the pretreatment liquid is not particularly limited and may be, for example, a pad method, a coating method, a spraying method, an inkjet method, or the like. The pretreatment liquid applied to the fabric may be heated and dried with warm air, a hot plate, or a heat roller.

1-2. Inkjet Ink

The inkjet ink is applied onto the above-described pretreatment layer. The inkjet ink is applied onto the pretreatment layer to form a fixing layer. The inkjet ink contains a fixing resin, and aggregation of the fixing resin is promoted by the cationic resin contained in the pretreatment layer. Thus, fixing of the fixing layer is promoted.

In the present embodiment, the inkjet ink contains a pigment, a fixing resin, a surfactant, and an aqueous medium. Hereinafter, each component will be described, and physical properties and preparation of the inkjet ink will also be described.

Pigment

The pigment is not particularly limited, and for example, may be an organic pigment or an inorganic pigment having the following number described in the Color Index.

Examples of orange or yellow pigments include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 83, C.I. Pigment Yellow 93, C.I. Pigment Yellow 94, C.I. Pigment Yellow 128, C.I. Pigment Yellow 138, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 213.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36.

Examples of blue or cyan pigments include Pigment Blue 1, 15, 15:1, 15:2, 15:3, 15:4, 15:6, 16, 17-1, 22, 27, 28, 29, 36, and 60.

Examples of green pigments include Pigment Green 7, 26, 36, and 50. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of the black pigment include Pigment Black 7, 28, and 26.

Examples of the white pigment include titanium dioxide.

The pigment is preferably further dispersed with a pigment dispersant from the viewpoint of enhancing the dispersibility in the ink. The pigment dispersant will be described later.

The pigment may be a self-dispersible pigment. The self-dispersible pigment is obtained by modifying the surface of a pigment particle with a group having a hydrophilic group, and has a pigment particle and a group having hydrophilicity bonded to the surface of the pigment particle.

Examples of the hydrophilic group include a carboxyl group, a sulfonic acid group, and a phosphorus-containing group. Examples of the phosphorus-containing group include a phosphoric acid group, a phosphonic acid group, a phosphinic acid group, a phosphite group, and a phosphate group.

Examples of commercially available products of self-dispersible pigments include Cab-0-Jet (Registered Trademark) 200K, 250C, 260M, and 270 V (sulfonic acid group-containing self-dispersible pigments), Cab-0-Jet (Registered Trademark) 300K (carboxylic acid group-containing self-dispersible pigments), Cab-0-Jet (Registered Trademark) 400K, 450C, 465M, 470V, and 480 V (phosphoric acid group-containing self-dispersible pigments) from Cabot Corporation.

The content of the pigment is not particularly limited. The content of the pigment is preferably adjusted from the viewpoints of facilitating appropriate adjustment of the viscosity of the inkjet ink and enabling formation of a high-density image. The content of the pigment is preferably 0.3 to 10 mass % and more preferably 0.5 to 3 mass % with respect to the inkjet ink. When the content of the pigment is greater than or equal to the lower limit value, the color of an image is more likely to be vivid. When the content of the pigment is equal to or less than the upper limit value, the viscosity of the inkjet ink does not become excessively high, and the discharge stability is not easily impaired.

Fixing Resin

The fixing resin is included for the purpose of fixing the fixing layer to the fabric, and the fixing of the fixing layer also fixes the pigment. The fixing resin may be, for example, a water-dispersible resin. The fixing resin preferably has a low glass transition temperature Tg from the viewpoints that fabric is less likely to become hard even after image formation, and satisfactory texture is maintained. Specifically, the Tg of the fixing resin is preferably −35° C. or less, and preferably −35 to −70° C. The Tg of the fixing resins can be measured by differential scanning calorimetry at a heating rate of 10° C./min in accordance with JIS K 7121.

The Tg of the fixing resin can be adjusted by the type of the fixing resin and the monomer composition. For example; in the case of a (meth)acrylic resin, as the content of the structural unit (a) derived from alkyl acrylate is increased, the Tg is likely to be lowered.

The type of the fixing resin is not particularly limited as long as the Tg satisfies the above range. Examples of the fixing resin include a (meth)acrylic resin, a polyurethane resin, and a polyester resin. Among these, a (meth)acrylic resin and a polyurethane resin are preferable from the viewpoints of having satisfactory flexibility and being more likely to maintain the texture of the fabric. In the present specification, (meth)acryl represents acryl, methacryl, or both of them.

Further, the fixing resin may have an ionic group. The ionic group of the fixing resin may be an ionic group that forms a pair with an ionic group of the pretreatment liquid adhered to the fabric. For example, the pretreatment liquid usually has a cationic group. Therefore, the fixing resin contained in the inkjet ink may have an anionic group. Examples of the anionic group include a carboxyl group, a sulfonic acid group and a phosphonic acid group.

The (meth)acrylic resin is a polymer including a structural unit derived from a (meth)acrylic monomer.

The (meth)acrylic monomer is a monomer having a (meth)acryloyl group, and examples thereof include (meth) acrylic acid; (meth)acrylic acid alkyl esters; and (meth) acrylamides. Note that (meth)acryl is a concept including both methacryl and acryl. Among them, (meth)acrylic acid alkyl ester is preferable.

That is, it is preferable that the (meth)acrylic resin include a structural unit (a) derived from (meth)acrylic acid alkyl ester, and further include a structural unit (b) derived from an unsaturated compound having an anionic group, from the viewpoints of enhancing water dispersibility and aggregability, and the like.

The structural unit (a) is derived from a (meth)acrylic acid alkyl ester. In view of lowering Tg of the resin, the (meth) acrylic acid alkyl ester preferably includes an acrylic acid alkyl ester. The alkyl group of the alkyl acrylate has a carbon number of, for example, 1 to 20, preferably 4 to 12, and more preferably 4 to 8. Examples of the acrylic acid alkyl ester include butyl acrylate, pentyl acrylate, hexyl acrylate, heptyl acrylate, and 2-ethylhexyl acrylate, and butyl acrylate is preferable.

The (meth)acrylic acid alkyl esters may be used alone or in combination of two or more types thereof. For example, an alkyl acrylate and an alkyl methacrylate may be used in combination.

The content of the structural unit (a) is not particularly limited, but is preferably 70 to 96% by mass with based on the total structural units constituting the (meth)acrylic resin. When the content is 70% by mass or more, the Tg of the resin is more easily lowered. When the content is 96% by mass or less, friction resistance and the like are less likely to be impaired. From the same viewpoint, the content is more preferably 80 to 90% by mass based on the total structural units constituting the (meth)acrylic resin.

The structural unit (b) is derived from an unsaturated compound having an anionic group. Examples of the unsaturated compound having a carboxy group include ethylenically unsaturated carboxylic acids such as acrylic acid, methacrylic acid, crotonic acid, itaconic acid, maleic acid, fumaric acid, and 2-acryloyloxyethylsuccinic acid. Examples of the unsaturated compound having a sulfonic acid group include vinylsulfonic acid, styrenesulfonic acid, and allylsulfonic acid. Examples of the unsaturated compound having a phosphate group include vinylphosphonic acid and 2-((meth) acryloyloxy) ethyl phosphate. Among these, ethylenically unsaturated carboxylic acids are preferable.

The content of the structural unit (b) is not particularly limited, but is preferably 3 to 15% by mass based on the total structural units constituting the (meth)acrylic resin. When the content is 3% by mass or more, the dispersibility and the cohesiveness of the fixing resin in the ink are more easily enhanced. When the content is 15% by mass or less, the viscosity of the ink is unlikely to be increased and the ejection stability is unlikely to be impaired. From the same viewpoint, the content of the structural unit (b) is more preferably 3 to 10% by mass based on the total structural units constituting the (meth)acrylic resin.

The (meth)acrylic resin may further include a structural unit (c) derived from another monomer other than the above-described monomers. Examples of other monomers include ethylenically unsaturated carboxylic acids (e.g., maleic acid and itaconic acid); styrenes (e.g., styrene, α-methylstyrene, and vinyltoluene); saturated fatty acid vinyls (e.g., vinyl acetate and vinyl propionate); vinyl compounds (e.g., 1,4-divinyloxybutane and divinylbenzene); allyl compounds (e.g., diallyl phthalate and triallyl cyanurate); monofunctional monomers such as acrylamide and the like; diethylene glycol di(meth)acrylate, 1,6-hexanediol di(meth)acrylate, propylene glycol di(meth)acrylate, polyfunctional (meth)acrylates such as N,N'-methylene bis (acrylamide), and bifunctional or higher-functional monomers such as polyfunctional acrylamide).

Examples of commercially available products of the (meth)acrylic resin include EMN-325 (ACRYSET manufactured by Nippon Shokubai Co., Ltd., acrylic elastomer, Tg: −50° C.), EMN-326 (ACRYSET manufactured by Nippon Shokubai Co., Ltd., acrylic elastomer, Tg: −50° C.) and the like.

The urethane resin is a thermoplastic urethane resin. The thermoplastic urethane resin may be, for example, a reaction product of a low molecular weight diol as a chain extender, a polyisocyanate, and a polyol. In addition, the urethane resin is preferably a self-emulsifying type. The self-emulsifying urethane resin may be, for example, a reaction product of a low molecular weight diol as a chain extender, a polyisocyanate having an anionic group, and a polyol.

Low molecular weight diols are difunctional aliphatic oligomers of glycols. Typical difunctional aliphatic oligomers of glycols include, for example, ethylene glycol, propylene glycol, 1,4 butanediol, 1,6 hexanediol, and the like.

The polyisocyanate is preferably a diisocyanate, and examples thereof include aromatic diisocyanates such as diphenylmethane diisocyanate, for example, 4,4'-diphenylmethane diisocyanate and 2,4'-diphenylmethane diisocyanate, and aliphatic diisocyanates such as 4,4'-dicyclohexylmethane diisocyanate and 2,4'-dicyclohexylmethane diisocyanate.

The polyol may be a polyester polyol or may be a polyether polyol. Examples of polyester polyols include reaction products of polycarboxylic acids and polyols. Examples of polycarboxylic acids include malonic acid, citric acid, succinic acid, glutaric acid, adipic acid, pimelic acid, azelaic acid, sebacic acid, maleic acid, fumaric acid, terephthalic acid, phthalic acid. Examples of the polyol to be reacted with the polycarboxylic acid include trimethylolpropane, trimethylolethane, 2-methylglucoside, sorbitol, low-molecular-weight polyols, for example, polyoxyethylene glycol, polyoxypropylene glycol, and block heteropolyoxyethylene-polyoxypropylene glycol, and the like.

The thermoplastic polyurethane includes a hard segment and a soft segment in the molecule. The hard segments are mainly moieties produced by the reaction of polyisocyanates and low molecular weight diols; the soft segments may be mainly moieties of polyols.

The mass ratio of the hard segment to the soft segment in the polymer chain of the thermoplastic polyurethane is, for example, 75/25 to 15/85 (mass ratio), preferably 60/40 to 25/75 (mass ratio). From the viewpoint of lowering Tg, it is preferable to increase the mass ratio of the soft segment. For example, the mass ratio of the soft segment may be higher than that of the hard segment.

Examples of commercially available products of thermoplastic polyurethanes include Elastollan 1185A (manufactured by BASF, thermo-plastic polyurethane elastomer, Tg: −41° C.).

The acid value of the fixing resin is not particularly limited. The oxidation of the fixing resins is preferably from 15 to 100 mgKOH/g, and more preferably from 20 to 80 mgKOH/g, from the viewpoint of further enhancing the friction fastness. The acid values of the fixing resins can be measured according to JIS K 0070.

The acid value of the fixing resin can be adjusted by the content of the structural unit (b). For example, when the content of the structural unit (b) derived from an unsaturated compound having an acidic group is increased, the acid value is increased.

The average particle size of the fixing resin in the inkjet ink is not particularly limited. The average particle size of the fixing resins is preferably from 30 to 200 nm and more preferably from 50 to 120 nm, for example, from the viewpoint of the ejection properties by inkjet. The average particle diameter is an average value of the primary particle diameters. The mean particle size can be measured, for example, as the dispersed particle size (Z-average) in Zataizer Nano S90 by Melvern.

The weight average molecular weight (Mw) of the fixing resin is not particularly limited. The weight average molecular weight (Mw) of the fixing resin is preferably high, for example, from the viewpoint of enhancing friction fastness, the weight average molecular weight of the fixing resin is preferably, for example, 10,000 to 1,000,000. On the other hand, from the viewpoint of making it easier to enhance the texture, the weight average molecular weight of the fixing resin is preferably low, and is preferably 10,000 or less. The weight average molecular weight of the fixing resin can be measured by gel permeation chromatography in terms of polystyrene. In particular, when the weight average molecular weight of the fixing resin is as low as 10,000 or less, the resin tends to adhere to the nozzle surface of the ink jet recording head. Even in such a case, the inclusion of the surfactant can reduce resin adhesion.

The content of the fixing resin is not particularly limited. The content of the fixing resin is preferably 1 to 20% by mass relative to the inkjet ink. When the content of the fixing resin is equal to or greater than 1% by mass, it is easy to further increase the fixability of the ink jet ink to the fabric. When the content of the fixing resin is 20% by mass or less, the texture is less likely to be impaired furthermore. From the same viewpoint, the content of the fixing resin is more preferably 5 to 15% by mass relative to the ink.

Surfactant

The surfactant can be added mainly for the purpose of suppressing adhesion of a fixing resin to a nozzle surface of a recording head onto which an inkjet ink is ejected. The surfactant is not particularly limited as long as it has affinity for the fixing resin. Such a surfactant is preferably a nonionic surfactant.

The nonionic surfactant is a surfactant that does not include an ionic group. Examples of the nonionic surfactant include the following surfactants:

- acetylene glycol-based surfactants such as acetylene glycol and ethylene oxides and/or propylene oxide adducts of acetylene glycol (e.g., 2,4,7,9-tetramethyl-5-decyne-4, 7,-diol, 3,6-dimethyl-4-octyne-3,6-diol, and the like, and ethylene oxides and/or propylene oxide adducts thereof);
- acetylene alcohol-based surfactants such as acetylene alcohols and ethylene oxides and/or propylene oxide adducts of acetylene alcohols (e.g., 3,5-dimethyl-1-hexane-3-ol and the like and ethylene oxides and/or propylene oxide adducts thereof);
- ether-based surfactants such as polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, and polyoxyalkylene alkyl ether;

ester-based surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate;

polyether-modified siloxane-based surfactant such as dimethylpolysiloxane; and fluorine-containing surfactants such as fluoroalkyl ester and perfluoroalkyl carboxylate.

These surfactants may be commercially available products. For example, examples of commercially available products of the polyether-modified siloxane compound include TEGO Wet240, TEGO WetKL245, TEGO Wet250, TEGO Wet260, TEGO Wet265, TEGO Wet280, manufactured by Evonik Industries AG, and LPX23288, LPX23289, LPX23347, BYK-348, and BYK-349 manufactured by BYK. Examples of commercially available products of the acetylene glycol surfactant and the acetylene alcohol surfactant include Olfine E1010 and Olefine EXP. 4036, Olefin EXP. 4123, Surfynol 465, and Surfynol 485 manufactured by Nissin Chemical Industry Co., Ltd. Examples of commercially available products of ether-based surfactants include EMULGEN 106 (polyoxyethylene lauryl ether) and EMULGEN 709 (polyoxyethylene higher alkyl ether) manufactured by Kao Corporation, and DYNWET800 and DYNWET800N (both are alcohol alkoxylates) manufactured by BYK.

Among these, acetylene glycol-based surfactants and acetylene alcohol-based surfactants are preferable, and ethylene oxide adducts of acetylene glycol are more preferable, from the viewpoints that affinity with the water-dispersible resin is better, and adhesion of the resin to a head is more easily suppressed.

The content of the surfactant is preferably 0.1 to 10% by mass with respect to the inkjet ink. When the content of the surfactant is 0.1% by mass or more, the adhesion of the resin to the head is more easily suppressed. When the content of the surfactant is 10% by mass or less, the friction fastness of the obtained image formed product is more hardly impaired. From this viewpoint, the content of the surfactant is more preferably 0.1 to 5% by mass with respect to the ink.

Aqueous Medium

The aqueous medium is not particularly limited, but preferably contains water, and preferably further contains a water-soluble organic solvent.

The content of the water is, for example, 20 to 70% by mass, and preferably 30 to 60% by mass with respect to the inkjet ink.

The water-soluble organic solvent is not particularly limited as long as it is compatible with water. From the viewpoint of facilitating the penetration of the inkjet ink into the inside of the fabric and the viewpoint of making the ejection stability in the inkjet method less likely to be impaired, it is preferable that the inkjet ink is less likely to increase in viscosity by drying. Therefore, the inkjet ink preferably contains a high-boiling-point solvent having a boiling point of 200° C. or higher.

The high-boiling point solvent having a boiling point of 200° C. or higher may be a water-soluble organic solvent having a boiling point of 200° C. or higher, and is preferably a polyol or a polyalkylene oxide.

Examples of the polyols having a boiling point of 200° C. or higher include dihydric alcohols such as 1,3-butanediol (boiling point: 208° C.), 1,6-hexanediol (boiling point: 223° C.), and polypropylene glycol; and trihydric or higher hydric alcohols such as glycerin (boiling point: 290° C.), and trimethylolpropane (boiling point: 295° C.).

Examples of the polyalkylene oxides having a boiling point of 200° C. or higher include ethers of dihydric alcohols such as diethylene glycol monoethyl ether (boiling point: 202° C.), triethylene glycol monomethyl ether (boiling point: 245° C.), tetraethylene glycol monomethyl ether (boiling point: 305° C.), tripropylene glycol monoethyl ether (boiling point: 256° C.), and polypropylene glycol; and ethers of trihydric or higher alcohols such as glycerin (boiling point: 290° C.) and hexanetriol.

The aqueous medium may further contain a solvent other than the high-boiling point solvent. Examples of other solvents include polyhydric alcohols having a boiling point of lower than 200° C. (e.g., ethyleneglycol, propyleneglycol, hexanetriol, etc); polyhydric alcohol ethers having a boiling point of lower than 200° C. (e.g., ethyleneglycol monomethylether, ethyleneglycol monobutylether, diethyleneglycol monomethylether, diethyleneglycol dimethylether, propyleneglycol monomethylether, propyleneglycol monoethylether; monohydric alcohols (e.g., methanol, ethanol, propanol, pentanol, hexanol, cyclohexanol, benzylalcohol); amines (e.g., ethanol amine, N-ethyldiethanolamine, morpholine, N-ethylmorpholine, ethylene diamine, diethylene diamine, triethylene tetramine); amides (e.g., formaldehyde, N,N-dimethylformamide, N,N-dimethylacetamide); heterocycles (e.g., 2-pyrrolidone, N-methyl-2-pyrrolidone, N-cyclohexyl-2-pyrrolidone, 2-oxazolidone, 1,3-dimethyl-2-imidazolidine); sulfoxides (e.g., dimethylsulfoxide); and sulfones (e.g., sulfolane).

The content of the water-soluble organic solvent is, for example, 20 to 70% by mass, and preferably 30 to 60% by mass, with respect to the inkjet ink.

Other Components

The inkjet ink may further contain other components, if necessary. Examples of the other components include a pigment dispersant, an antiseptic, a antifungal agent, and a pH adjuster.

The pigment dispersant is present in the ink so as to surround the surfaces of the pigment particles. Alternatively, the pigment dispersant is adsorbed onto the surface of the pigment particle to form a pigment dispersion liquid, thereby satisfactorily dispersing the pigment. The pigment dispersant is preferably a polymer dispersant, more preferably an anionic polymer dispersant.

The anionic polymer dispersant is a polymer dispersant having a hydrophilic group such as a carboxylic acid group, a phosphorus-containing group, and a sulfonic acid group. The anionic polymer material is preferably a polymer dispersant having a carboxylic acid group.

The polymeric dispersant having a carboxylic acid group may be a polycarboxylic acid or a salt thereof. Examples of the polycarboxylic acid include (co)polymers of monomers selected from acrylic acid or a derivative thereof, maleic acid or a derivative thereof, itaconic acid or a derivative thereof, and fumaric acid or a derivative thereof, and salts thereof. Examples of other monomers constituting the copolymer include styrene and vinylnaphthalene.

The polymer dispersing agent preferably has an anionic-group-equivalent weight of, for example, 1.1 to 3.8 meq/g in order to sufficiently disperse the colorant particles. When the anionic group equivalent weight is within the above range, high pigment dispersibility is easily obtained without increasing the molecular weight of the anionic polymer dispersant. The anionic group equivalent weight of the anionic polymer dispersant can be determined from the acid value. The acid number can be measured in accordance with JIS K0070.

The weight average molecular weight (Mw) of the polymer dispersant is not particularly limited. The weight average molecular weight (Mw) of the polymer dispersant is preferably 5,000 to 30,000. When the weight average molecular weight (Mw) of the polymer dispersant is 5,000 or more, pigment particles are easily and sufficiently dispersed. When the weight average molecular weight (Mw) of the polymer dispersant is 30,000 or less, the ink does not thicken excessively, and therefore, the permeability into fabric is less likely impaired. The weight average molecular weight (Mw) of the polymer dispersant can be measured by the same method as described above.

The content of the polymer dispersant may be in a range in which the polymer dispersant sufficiently disperses the pigment particles and has a viscosity to the extent that the permeability into the fabric is not impaired. The content of the polymer dispersant is not particularly limited. The content of the polymer dispersant is preferably from 20 to 100% by mass, more preferably from 25 to 60% by mass, with respect to the pigment.

Examples of the antiseptic or antifungal agent include aromatic halogen compounds (e.g., Preventol CMK), methylene dithiocyanate, halogen-containing nitrogen-sulfur compounds, 1,2-benzisothiazolin-3-one (e.g., PROXEL GXL), and the like.

Examples of the pH adjuster include citric acid, sodium citrate, hydrochloric acid, and sodium hydroxide.

Physical Properties

The viscosity of the inkjet ink at 25° C. is not particularly limited as long as the ejection properties by an inkjet method are satisfactory. The viscosity of the inkjet ink at 25° C. is preferably 3 to 20 mPa-s, and more preferably 4 to 12 mPa-s. The viscosity of the ink can be measured at 25° C. using an E-type viscometer.

Preparation of Inkjet Ink

The inkjet ink can be produced by any method. For example, an inkjet ink can be produced through 1) a step of mixing a pigment, a pigment dispersant, and a solvent (such as water) to obtain a pigment dispersion liquid, and 2) a step of further mixing the obtained pigment dispersion liquid, a dispersion containing the above-described water-dispersible resin (resin particle dispersion), an aqueous medium, and the like.

1-3. Overcoat Layer Forming Liquid

The overcoat layer forming liquid is applied onto the above-described pretreatment layer and fixing layer to form an overcoat layer. The overcoat layer can suppress stickiness due to the pretreatment layer and the fixing layer.

The overcoat layer forming liquid contains anionic resin fine particles. The anionic resin fine particles preferably have a glass transition temperature Tg of 50° C. or higher, and more preferably 100° C. or higher, from the viewpoint of suppressing stickiness of a textile-printed image and deterioration of texture of a fabric (image formed product) on which a textile-printed image is formed. The glass-transition temperature Tg of the anionic resin fine particles can be measured by differential scanning calorimetry at a heating rate of 10° C./min in accordance with JIS K 7121.

Examples of the anionic resin fine particles include fine particles of a polymer having a functional group capable of having a negative charge. Examples of such a functional group include a carboxyl group, a hydroxyl group, and a sulfate group.

Examples of commercially available products of the anionic resin fine particles include AQUACER507 manufactured by BYK and Hitec E-4A manufactured by Toho Chemical Industry Co., Ltd.

The content of the anionic resin fine particles is preferably 2% by mass to 6% by mass, and more preferably about 4% by mass, with respect to the overcoat layer forming liquid.

The method for applying the overcoat layer forming liquid is not particularly limited, and may be, for example, a pad method, a coating method, a spraying method, or an inkjet method. The overcoat layer forming liquid applied to the fabric may be heated and dried using warm air, a hot plate, or a heat roller.

2. Image Forming Apparatus and Image Forming Method

2-1. Image Forming Apparatus

An outline of an image forming apparatus used for forming a textile-printed image according to the invention will be described.

FIG. 1 is a schematic diagram which shows an outline of an embodiment of an image forming apparatus 100 used for forming a textile-printed image.

As illustrated in FIG. 1, the image forming apparatus 100 includes a pretreatment liquid container 110*a*, an ink container 110*b*, an overcoat layer forming liquid container 110*c*, a recording head 120, a head carriage 130, a drying section 140, and a conveyance section 150.

The pretreatment liquid container 110*a*, the ink container 110*b*, and the overcoat layer forming liquid container 110*c* respectively accommodate the pretreatment liquid a, the inkjet ink b, and the overcoat layer forming liquid c, and are arranged in this order from the upstream side to the downstream side in the conveyance direction Y of the fabric 160. The fabric 160 is conveyed by the conveyance section 150.

The pretreatment liquid container 110*a*, the ink container 110*b*, and the overcoat layer forming liquid container 110*c* supply the pretreatment liquid a, the inkjet ink b, and the overcoat layer forming liquid c to the recording heads 120 connected thereto, respectively. The recording heads 120 eject the pretreatment liquid a, the inkjet ink b, and the overcoat layer forming liquid c, respectively, onto the fabric 160 to form a textile-printed image.

A plurality of ink containers 110*b* and a plurality of recording heads 120 may be disposed, for example, for the respective colors of ink.

The head carriage 130 is mounted with the recording heads 120 described above, and scans the recording heads 120 in a main scanning direction substantially orthogonal to the conveyance direction Y of the fabric 160. The recording head 120 may move integrally with or separately from the ink container 110*b*.

The drying section 140 is disposed on the downstream side of each accommodation unit and each recording head 120 in the transport direction Y. The drying section 140 can be a heating means such as a hot air drying section that blows hot air, a heater that irradiates infrared rays or ionizing radiation, or a heating roller. The drying section 140 dries the textile-printed image formed on the fabric 160.

2-2. Image Forming Method

Next, the method for producing a textile-printed image formed product will be specifically described with reference to FIG. 1. The method for producing a textile-printed image formed product according to the present embodiment includes steps of 1) forming a textile-printed image by discharging a pretreatment liquid, an inkjet ink, and an overcoat layer forming liquid onto a fabric in this order from each of the recording heads 120 and causing the liquids to adhere to the fabric, and 2) drying and fixing the textile-printed image.

Step 1)

First, the pretreatment liquid, the inkjet ink, and the overcoat layer forming liquid are ejected in this order from the recording heads 120 to form a pretreatment layer on the fabric 160 moving in the conveyance direction Y. A fixing layer is formed thereon, and an overcoat layer is formed thereon to form a textile-printed image.

Step 2)

Next, the textile-printed image formed on the fabric 160 is dried by the drying section 140 to remove the solvent component in the ink. Thus, the pigment is fixed to the fabric 160. Thus, a textile-printed image formed product is obtained.

The drying method is not particularly limited, and may be a method using a heater, a hot air dryer, a heating roller, or the like. In the present embodiment, it is preferable to heat and dry both sides of the fabric by the drying section 140 using a hot air dryer and a heater.

The drying temperature may be set so as to evaporate the solvent component in the ink. Specifically, the drying temperature is equal to or higher than a temperature at which the solvent component evaporates and preferably equal to or lower than a temperature that is higher than the glass transition temperature Tg of the fixing resin by 170° C. (Tg+170° C. or lower). Note that the drying temperature may be room temperature.

2-3. Evaluation of Image

In the textile-printed image according to the present embodiment, a decrease in the texture of the fabric is suppressed, and the stickiness of the textile-printed image is also suppressed. Specifically, the texture is evaluated by the difference being small in bending torque force in a bending test between a fabric on which a textile-printed image is formed under predetermined conditions and a fabric before the textile-printed image is formed. From the viewpoint of improving the texture of a fabric on which a textile-printed image is formed, the difference in bending torque is preferably 0.006 gf·cm or less, more preferably 0.004 gf·cm or less, and still more preferably 0.002 gf·cm or less.

Figure 2:
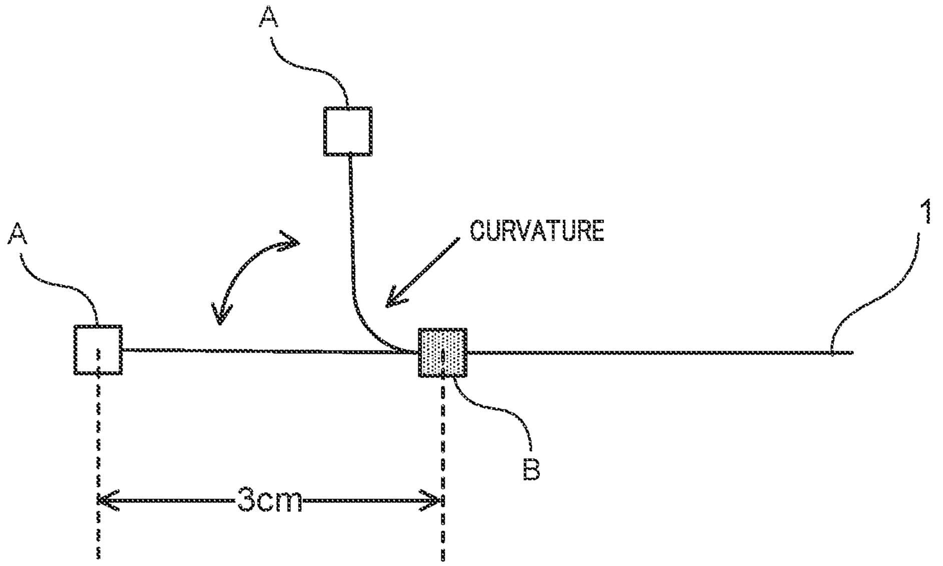
FIG. 2 is a schematic diagram illustrating an outline of a bending test.

The bending test can be performed by the following procedure. FIG. 2 is a schematic diagram illustrating an outline of a bending test.

1) First, a pretreatment liquid, an inkjet ink, and an overcoat layer forming liquid are applied onto a fabric. At this time, an image is formed so that the adhesion amount of the fixing layer formed by the inkjet ink is 3 $g/m^2$ to 10 $g/m^2$ and dried to obtain a textile-printed image formed product. The fabric on which the image was formed (textile-printed image formed) was cut out to the size of the 5×20 cm and used as a sample piece 1. Next, as illustrated in FIG. 2, one tip end A of the sample piece 1 in a longitudinal direction and a position B separated from the tip end by a 3 cm are sandwiched between clips of a bending tester. Then, the tip A is rotated with the position B as a base point, and the sample piece 1 is bent until the curvature of the sample piece 1 in the vicinity of the position B become 2.5 $cm^1$. The force required at this time (the bending torque of the fabric on which the textile-printed image is formed (the textile-printed image formed product)) is measured.
2) The same test is performed on a fabric (sample piece of 5×20 cm) on which no image is formed (bending torque of a white letter portion).
3) The value of the bending torque obtained in the above 2) is subtracted from the value of the bending torque obtained in the above 1) to calculate the difference between the bending torques.

As the bending tester, for example, KES-FB2-A pure bending tester (Kato Tech Co., Ltd) can be used.

The "adhesion amount of the textile-printed image" can be obtained by subtracting the weight of the fabric on which no textile-printed image is formed from the weight of the textile-printed image formed product (the fabric on which the textile-printed image is formed).

The difference in bending torque can be adjusted by the amount or type of fixing resin when the amount of adhered pigment is constant. For example, the lower the Tg of the fixing resin, the smaller the difference in bending torque is likely to be. Furthermore, the smaller the amount of the fixing resin is, the smaller the difference in the bending torque is likely to be.

In addition, in the textile-printed image according to the present embodiment, stickiness is suppressed. Specifically, stickiness is evaluated by the difference being small in the average friction coefficient MIU between a fabric on which a textile-printed image is formed under a predetermined condition and a fabric on which a textile-printed image is not formed. Further, it is evaluated by the difference in the average deviation MMD of the average friction coefficient being small. From the viewpoint of suppressing stickiness, the difference in the average friction coefficient MIU is preferably 0.42 or less, more preferably 0.35 or less, and still more preferably 0.3 or less. From the same viewpoint, the difference in the average deviation MMD of the average friction coefficient is preferably 0.24 or less, more preferably 0.2 or less, and still more preferably 0.15 or less.

The difference in the average friction coefficient MIU and the difference in the average deviation of the average friction coefficient MMD can be measured as follows.

The measurement can be performed by using a friction tester KES-SE (manufactured by Kato Tech Co., Ltd). As samples, a fabric on which a textile-printed image is not formed and a textile-printed image formed product are used. The average friction coefficient MIU and the average deviation of the average friction coefficient MMD are determined for each of the samples. To be specific, a sample is placed on a sample table of the friction tester, and a piano wire sensor having a contact surface of 1 $cm^2$ is used as a contactor to be brought into contact with the sample. A load of 50 g is applied to the contact, and the contactor is reciprocated by a moving distance of 30 mm. The measurement environment may be a temperature of 23° C. and a humidity of 65%. A difference in the average friction coefficient MIU and a difference in the average deviation of the average friction coefficient MMD can be obtained by calculating differences from the respective measurement results.

EXAMPLE

Hereinafter, the present invention will be specifically described with reference to Examples, but the present invention is not limited thereto.

Example 1

The pretreatment liquid, the inkjet ink, and the overcoat layer forming liquid to be used for obtaining the textile-printed image of Example 1 were obtained as follows.

1-1. Pretreatment Liquid

The following components were mixed in the following proportions based on 100 parts by mass of the pretreatment liquid to obtain a pretreatment liquid.

PAS-H-1L (manufactured by Nit-Bo Medical Co., Ltd) as cationic resin: 4.7 parts by mass
Ethylene glycol: 10 parts by mass
Propylene glycol: 10 parts by mass
Glycerin: 10 parts by mass
Surfactants E-1010: 0.1 parts by mass
Proxel GXL (manufactured by Lonza Japan Ltd., 1,2-benzisothiazolin-3-one, antifungal agent): 0.10 parts by mass
Ion-exchanged water: Remaining part

1-2. Inkjet Ink

The inkjet ink contains a pigment (pigment dispersion liquid), a fixing resin, a surfactant, a water-soluble organic solvent, and an antifungal agent. These components were prepared as follows.

Seven parts by mass of styrene-butyl acrylate-methacrylate copolymer (anion dispersing agent, weight average molecular weight of 16,000, anion group equivalence of 3.5 meq/g) were mixed with 78 parts by mass of water. After mixing, the mixture was heated and stirred to prepare a neutralized product of the pigment dispersant. To this mixture, 15 parts by mass of C. I. Pigments Blue 15:3 was added and premixed, the mixture was dispersed using a sand grinder filled with 50% by volume fraction of 0.5 mm zirconia beads to obtain a cyan pigment dispersion liquid having a pigment density of 15% by mass.

EMN-325 (manufactured by Nippon Shokubai Co., Ltd., Tg−50° C.) was used as the fixing resin.

As the surfactant, E-1010 (manufactured by Nissin Chemical Industry Co., Ltd) was used.

As the water-soluble organic solvent, ethylene glycol (boiling point: 197° C.), glycerin (boiling point: 290° C.), and propylene glycol (boiling point: 188° C.) were used.

Proxel GXL (manufactured by Lonza Japan Ltd., 1,2-benzisothiazolin-3-one) was used as a fungicide.

An inkjet ink was obtained by mixing the above components in the following proportions, with the mass of the inkjet ink as 100 parts by mass.

Pigment dispersion liquid: 10 parts by mass (pigment density of 15% by mass, solid concentration of 1.5 parts by mass)
Fixing resin: 10 parts by mass
Ethylene glycol: 10 parts by mass
Propylene glycol: 10 parts by mass
Glycerin: 10 parts by mass
Surfactant: 0.5 parts by mass
Proxel GXL (manufactured by Lonza Japan Ltd., 1,2-benzisothiazolin-3-one, antifungal agent): 0.10 parts by mass
Ion-exchanged water: Remaining part 1-3. Overcoat Layer Forming Liquid The following components were mixed in the following proportions based on 100 parts by mass of the overcoat layer forming liquid to obtain an overcoat layer forming liquid.

AQUACER507 (manufactured by BYK) as anionic resin fine particles: 10 parts by mass
Ethylene glycol: 10 parts by mass
Propylene glycol: 10 parts by mass
Glycerin: 10 parts by mass
Surfactants E-1010: 0.1 parts by mass
Proxel GXL (manufactured by Lonza Japan Ltd., 1,2-benzisothiazolin-3-one, antifungal agent): 0.10 parts by mass
Ion-exchanged water: Remaining part

2. Textile-Printed Image Formation

Cotton satin (100% cotton, Product name: 60 Cotton Satin, manufactured by Okadaya) was prepared as fabric. Each of the pretreatment liquid, the inkjet ink, and the overcoat layer forming liquid described above was applied to the cotton satin by an inkjet method and then dried, to obtain a textile-printed image formed product. Konica Minolta Head #204 was used as the recording head. The ejection of each of the pretreatment liquid, the inkjet ink, and the overcoat layer forming liquid from the recording head was performed in the main scanning 540 dpi×and the sub-scanning 720 dpi. Note that dpi represents the number of ink droplets (dots) per 2.54 cm. The ejection frequency was set to 22. 4 kHz. Then, it was dried at 120° C. for 5 minutes by a belt conveying type drying section to obtain a textile-printed image formed product. The adhesion amounts of the pretreatment layer, the fixing layer, and the overcoat layer were respectively 1 g/m$^2$, 6 g/m$^2$, and 3 g/m$^2$. The adhesion amount was obtained from the ink ejection amount.

3. Evaluation

The stickiness and texture of the textile-printed image were evaluated as follows.

Stickiness

The resulting textile-printed image formed product was evaluated for stickiness by measuring the difference in the following average friction coefficient MIU.

1) The MIU was measured using a friction tester KES-SE (manufactured by Kato Tech Co., Ltd). As samples, a fabric on which no textile-printed image was formed and a textile-printed image formed product were used, and the average friction coefficient MIU was measured for each of them. To be specific, each sample was placed on a sample table of the friction sensitivity tester, and a piano wire sensor having a contact surface of 1 $cm^2$ was used as a contactor to be in contact with the sample. A load of 50 g was applied to the contact, and the contactor was reciprocated at a moving distance of 30 mm. The measurement environment was set to a temperature of 23° C. and a humidity of 65%. The difference in the average friction coefficient MIU was obtained by subtracting the average friction coefficient MIU of the fabric on which no textile-printed image was formed from the average friction coefficient MIU of the textile-printed image formed product.

2) The difference in average friction coefficient MIU was evaluated according to the following criteria.

◎: MIU difference was less than 0.35

○: MIU difference was 0.35 or more and 0.42 or less

Δ: MIU difference was more than 0.42 and 0.5 or less x: MIU difference was more than 0.5

Texture

The obtained textile-printed image formed product was subjected to the following bending test to evaluate the texture.

1) The fabric on which the textile-printed image was formed was cut out to the size of the 5×20 cm and used as a sample piece 1. Next, as shown in FIG. 2, one end A in the longitudinal direction of the sample piece 1 and a position B apart from the end by 3 cm were sandwiched between clips of a bending tester KES-FB2-A pure bending tester (Kato Tech Co., Ltd). Then, the tip A was rotated with the position B as a base point, and the sample piece 1 was bent until the curvature of the sample piece 1 in the vicinity of the position B became 2.5 $cm^{-1}$. The force required for bending (bending torque of the image forming section) was measured.

2) The same test was performed on a fabric on which no image was formed (5×20 cm sample piece) (bending torque of white letter portion).

3) The difference between the bending torques obtained in the above 1) and 2) was calculated.

Then, the texture was evaluated according to the following criteria.

○: Difference in bending torque was 0.006 gf·cm or less x: Difference in bending torque was more than 0.006 gf·cm Table 1 shows the evaluation results.

Examples 2 to 5 and Comparative Examples 1 and 2

Textile-printed image formed products of Examples 2 to 5 and Comparative Example 1 were produced and evaluated in the same manner as in Example 1 described above except that the cationic resin contained in the pretreatment liquid was changed as in Table 1. In Comparative Example 2, a textile-printed image formed product was produced and evaluated in the same manner as in Example 1 described above except that the pretreatment liquid was not used.

TABLE 1

| | Pretreatment liquid | | Inkjet ink | Overcoat layer forming liquid | | |
|---|---|---|---|---|---|---|
| | Cationic resin | Mw | Tg | Tg | Stickiness | Texture |
| Example 1 | PAAS-H-1L | 8500 | −43° C. | 110° C. | ○ | ○ |
| Example 2 | Catiomaster PD-7 | 5000 | −43° C. | 110° C. | ○ | ○ |
| Example 3 | Catiomaster PD-30 | 9000 | −43° C. | 110° C. | ○ | ○ |
| Example 4 | Catiomaster PE-30 | 9000 | −43° C. | 110° C. | ○ | ○ |
| Example 5 | Unisence KEH100 | 1400 | −43° C. | 110° C. | ○ | ○ |
| Comparative example 1 | MPT-60 | 730 | −43° C. | 110° C. | x | x |
| Comparative example 2 | None | — | −43° C. | 110° C. | ○ | x |

In all of Examples 1 to 5, the suppression of stickiness and the texture were satisfactory, whereas in Comparative Example 1, the suppression of stickiness and the texture were both unsatisfactory. It is considered that this is because the weight average molecular weight (Mw) of the cationic resin is all 1,000 or more in Examples 1 to 5, whereas it is less than 1,000 in Comparative Example 1. When the cationic resin having a weight average molecular weight of less than 1,000 is used as described above, it is considered that the cationic resin causes stickiness of a textile-printed image.

On the other hand, when the pretreatment liquid is not used and the cationic resin is not used as in Comparative Example 2, the stickiness of the textile-printed image is satisfactory, but the texture remains poor. Thus, it has been found that in order to achieve both of them, it is effective to use a pretreatment liquid containing a cationic resin having a weight average molecular weight of 1000 or more.

INDUSTRIAL APPLICABILITY

According to the present invention, a textile-printed image formed product having a satisfactory texture can be obtained while suppressing stickiness. Therefore, the present invention is expected to broaden the range of textile-printed image forming technologies and contribute to the development and spread of technologies in the same field.

Although embodiments of the present invention have been described and illustrated in detail, the disclosed embodiments are made for purposes of illustration and example only and not limitation. The scope of the present invention should be interpreted by terms of the appended claims.

What is claimed is:

1. A textile-printed image formed product comprising: a fabric and a textile-printed image formed on the fabric, the textile-printed image including a pretreatment layer, a fixing layer, and an overcoat layer, wherein:

an adhesion amount of the textile-printed image is 1 $g/m^2$ to 10 $g/m^2$, and when the textile-printed image formed product and the fabric on which the textile-printed image is not formed are measured with a friction tester KES-SE, a difference in average friction coefficient MIU is 0.42 or less; and when the textile-printed image formed product and the fabric on which the textile-printed image is not formed are measured with a bending tester KES-FB2-A, a difference in bending torque is 0.006 gf·cm or less.

2. The textile-printed image formed product according to claim 1, wherein the fabric is cotton satin, and the fixing layer contains a pigment.

3. An inkjet ink used for forming the fixing layer of the textile-printed image formed product according to claim 1, the inkjet ink comprising: a fixing resin having a glass transition temperature Tg of −35° C. or lower.

4. An overcoat layer forming liquid used for forming the overcoat layer of the textile-printed image product according to claim 1, the overcoat layer forming liquid comprising: an anionic resin fine particle having a glass transition temperature Tg of 50° C. or higher.

5. A pretreatment liquid used for forming the pretreatment layer of the textile-printed image formed product according to claim 1, the pretreatment liquid comprising: a cationic resin having a weight average molecular weight Mw of 1,000 to 10,000.

6. An image forming apparatus for producing the textile-printed image formed product according to claim 1.

* * * * *